(12) United States Patent
Kosa et al.

(10) Patent No.: US 6,605,905 B2
(45) Date of Patent: Aug. 12, 2003

(54) DISCHARGE LAMP DRIVING APPARATUS AND LIGHTING FIXTURE USING THE APPARATUS

(75) Inventors: Kiyoteru Kosa, Kanagawa-ken (JP); Fuminori Nakaya, Kanagawa-ken (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 152 days.

(21) Appl. No.: 09/910,865

(22) Filed: Jul. 24, 2001

(65) Prior Publication Data

US 2002/0047603 A1 Apr. 25, 2002

(30) Foreign Application Priority Data

Jul. 26, 2000 (JP) ........................................ 2000-225590

(51) Int. Cl.$^7$ ................................................. H05B 37/02
(52) U.S. Cl. ............... 315/224; 315/200 R; 315/209 R; 315/307
(58) Field of Search ................................. 315/224, 226, 315/200 R, 209 R, 307, 308, 291

(56) References Cited

U.S. PATENT DOCUMENTS

| | | | | | |
|---|---|---|---|---|---|
| 5,083,065 | A | * | 1/1992 | Sakata et al. | 315/307 |
| 5,214,356 | A | * | 5/1993 | Nilssen | 315/224 |
| 5,914,572 | A | * | 6/1999 | Qian et al. | 315/307 |
| 5,932,976 | A | * | 8/1999 | Maheshwari et al. | 315/291 |
| 6,020,691 | A | * | 2/2000 | Sun et al. | 315/307 |

* cited by examiner

Primary Examiner—Hoang Nguyen
(74) Attorney, Agent, or Firm—Pillsbury Winthrop LLP (57) ABSTRACT

A discharge lamp driving apparatus includes, a direct current power supply having a rectifier, an inverter circuit, which has stable and unstable output terminals, converting a direct current power to an alternating current power with a predetermined high frequency and driving a discharge lamp having a folded portion, a controller for being able to dim the discharge lamp, and an auxiliary conductor, arranged to the folded portion of the discharge lamp, and electrically connected to the stable potential output terminal of the inverter.

7 Claims, 6 Drawing Sheets

DISCHARGE LAMP DRIVING APPARATUS AND LIGHTING FIXTURE USING THE APPARATUS

FIELD OF THE INVENTION

The present invention relates to a discharge lamp driving apparatus which can dim a discharge lamp and a lighting fixture.

BACKGROUND OF THE INVENTION

Figure 10:
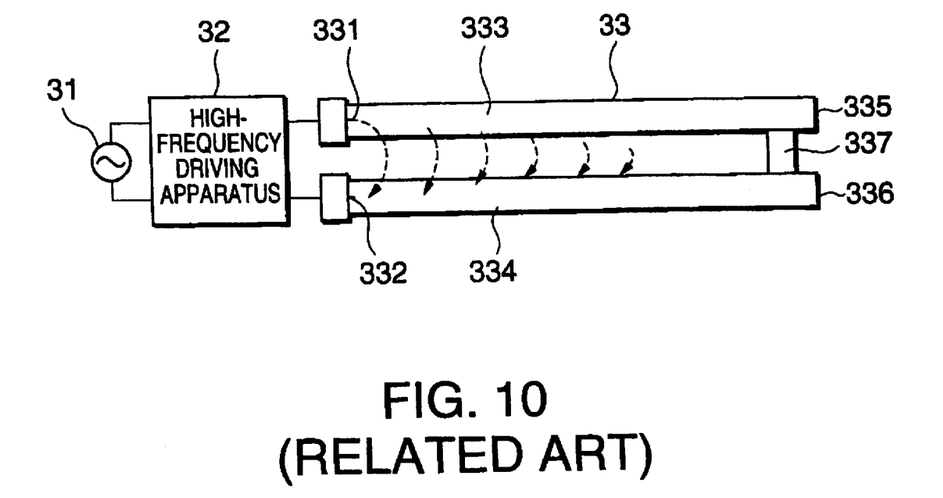
FIG. 10 is a diagram showing an operation of driving apparatus for a conventional discharge lamp.

A compact fluorescent lamp used for general lighting has a folded portion that is formed into a U-shape or H-shape at the end of the lamp. A fluorescent lamp is useful as a light source that is compact in size and capable of obtaining a high luminance. FIG. 10 shows diagram of a driving apparatus for operating a folded discharge lamp with a high frequency power. Reference numeral 31 denotes, for instance, a 50 Hz, 100V alternating current power source. A high-frequency driving apparatus 32 comprises, for instance, a high-frequency inverter operates at a power supplied from the alternating current power source and lights a folded discharge lamp 33 at a high frequency in tens of kHz.

The high-frequency driving apparatus 32 is capable of making the dimming control continuously in several steps of non-step by varying frequency of a high-frequency power source for operating lamps. The folded discharge lamp 33 comprises electrodes 331, 332 to which a high frequency voltage is applied from the high-frequency driving apparatus 32, two straight tubes 333, 334 arranged in parallel with each other and a communicating tube 337 arranged to a position slightly offset to the electrodes from the ends 335, 336 of the straight tubes 333, 334, for communicating the straight tubes 333, 334.

Figure 11:
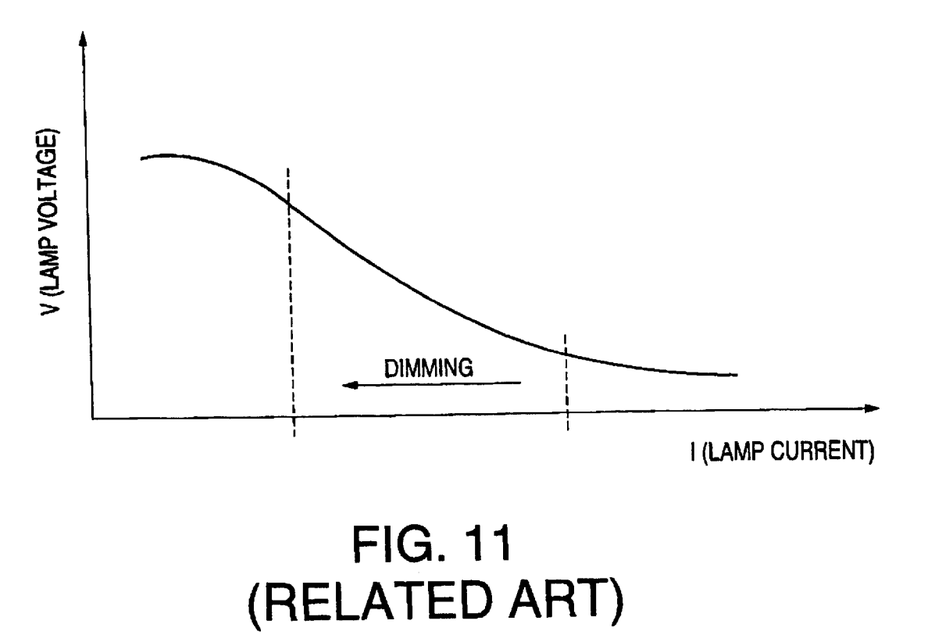
FIG. 11 is a graph showing a lamp voltage as a function of a lamp current regarding to a fluorescent lamp.

In the discharge lamp driving apparatus shown in FIG. 10, the lamp current flows through a folded passage formed by two straight tubes 333, 334 and the communicating tube 337 between the electrodes 331, 332 during the normal high-frequency lighting. However, when the folded discharge lamp 33 is operated and dimmed (i.e., decreased brightness) at a high-frequency (reduced the brightness), the lamp current I decreases but the lamp voltage V increases between the electrodes 331, 332, as shown in FIG. 11. When the folded discharge lamp is thus dimmed, high frequency leakage currents (shown by dotted lines in FIG. 10) from one electrode 331 to the other electrode 332 occur across the straight tubes 333, 334 without passing through the straight tubes 333, 334 and the communicating tube 337, due to that positive columns in the two straight tubes 333, 334 are adjacent to each other.

This leakage current becomes larger at a position closer to the electrodes 331, 332, as it is closer to a high frequency power source (i.e., the energy supply source). On the other hand, the leakage current becomes smaller at a position remoter from the electrodes 331, 332. This leakage current effectually acts on the fluorescent material coating of the straight tubes 333, 334. Accordingly, the leakage current is converted to a visible light and contributes to increasing brightness. As a result of such distribution of leakage energy, brightness at the straight tubes 333, 34 of the folded discharge lamp 33 becomes brighter at a position closer to the electrodes 331, 332 and becomes darker when goes away therefrom. That is, the more closer to the tubes 335, 336, lamp current and leakage current flowing through the straight tubes 333, 334 becomes less and the light becomes dark. Moreover, the more the degree of dimming becomes higher, the more the degree of non-uniformity of brightness (non-uniformity of luminance) will become higher. This is because the more the degree of dimming becomes large, the more lamp voltage increases. When the degree of dimming becomes higher and the brightness distribution along the straight tubes 333, 334 becomes non-uniform, the lamp lighting state may become unstable or flickering or the lighting may go out. By the way, there have been adapted other methods that a connector is brought to face the entire surfaces of the discharge lamp tubes or pasted on one side of the discharge tubes in the direction of tube length in order to improve starting characteristic of a discharge lamp or flickering, etc. But no effect could be obtained to prevent non-uniform of luminance and unstable lighting caused from leakage current as in a folded discharge lamp.

As described above, there was such a problem that when a folded discharge lamp is operated at high frequency and dimmed, the light is darkened when going away from the electrodes due to leakage current between adjacent tubes and the light becomes non-uniform of(non-uniform of luminance) along the tubes.

SUMMARY OF THE INVENTION

An object of the present invention is to provide a discharge lamp driving apparatus and a lighting fixture that are which can dim stably without causing non-uniform of brightness along lamp tubes when lighting and dimming a folded discharge lamp.

A discharge lamp driving apparatus according to one aspect of the invention comprises, a direct current power supply having a rectifier, an inverter circuit, which has stable and unstable output terminals, converting a direct current power to an alternating current power with a predetermined high frequency and driving a discharge lamp having a folded portion, a controller for being able to dim the discharge lamp, and an auxiliary conductor, arranged to the folded portion of the discharge lamp, and electrically connected to the stable potential output terminal of the inverter.

In another aspect of the invention, a lighting fixture comprises, a lighting fixture body, and a discharge lamp driving apparatus comprising a direct current power supply having a rectifier, an inverter circuit, which has stable and unstable output terminals, converting a direct current power to an alternating current power with a predetermined high frequency, and driving a discharge lamp having a folded portion, a controller for dimming the discharge lamp, an auxiliary conductor, located to the folded portion of the discharge lamp, and electrically connected to the stable potential output terminal of the inverter.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant disadvantages thereof will be readily obtained as the same becomes better understood by reference to the following detailed description when considered in connection with the accompanying drawings, wherein.

DESCRIPTION OF THE EMBODIMENTS

Some embodiments of the present invention will be described below, in reference to the attached drawings, FIGS. 1 to 9.

Figure 1:
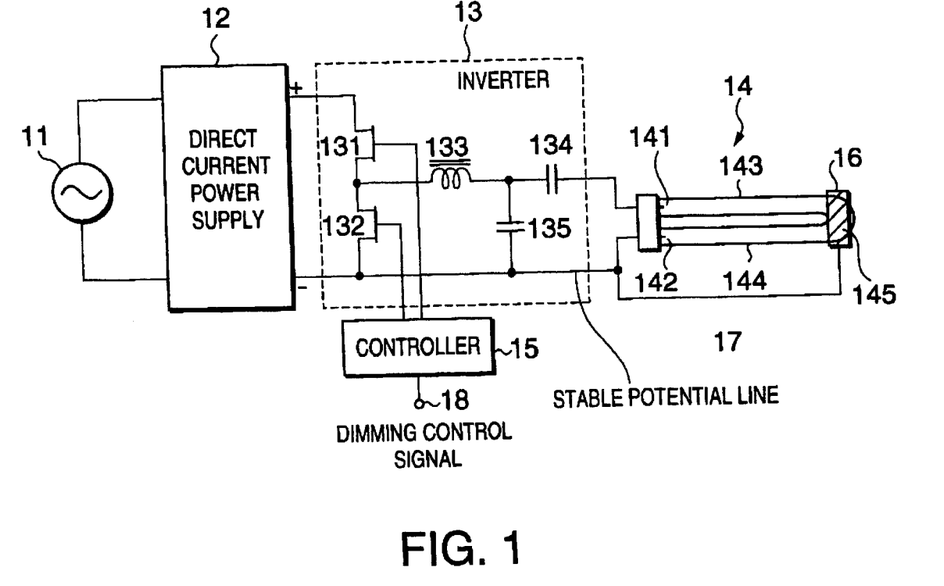
FIG. 1 is a block diagram showing a discharge lamp driving apparatus according to a first embodiment of the present invention.

FIG. 1 is a block diagram showing a discharge lamp driving apparatus according to a first embodiment of the present invention.

In FIG. 1, the discharge lamp driving apparatus comprises a direct current power supply 12, an inverter 13, a discharge lamp 14 having a folded portion, a controller 15 and an auxiliary conductor 16.

The direct current power supply 12 which is provided with a full wave rectifier and a smoothing capacitor, rectifies and smoothes output voltage of an alternating current power source. The inverter 13 includes a pair of switching elements 131, 132, for example, bipolar transistors, which are turned on and off alternately, converts a direct current power to an alternating current voltage with a predetermined high frequency of about 45kHz and supplies the high frequency power to the discharge lamp 14.

The inverter 13, as shown in FIG. 1, is configured in a modified half bridge type inverter, and between the positive output terminal (unstable potential terminal) and the negative output terminal (stable potential terminal), drain sources of two FETs are connected in series and serve as the switching elements 131, 132.

The stable potential terminal of the inverter indicates the output terminal with its line isolated from a resonant coil or a resonant capacity. Further, when each of the switching elements 131, 132, is a parasitic diode (not shown) that is inevitably made along with an original structure of the FET, can be used for passing a reverse current. The inverter may include a single transistor type inverter, a double transistor or a thyristor, and half-bridge type, and be made up a full bridge type, a push-pull type, a modified half-bridge type.

Between the connection node of the switching elements 131, 132 and the electrode 141 of the discharge lamp 14, a series circuit comprising a choke coil 133 and a capacitor 134 is connected. The connection node of the choke coil 133 with the capacitor 134 is then not only connected to the negative output terminal (stable potential terminal) of the direct current power supply 12 via the capacitor 135 but also to another electrodes 142 of the discharge lamp 14. A switching pulse is supplied to the gates of the switching elements 131, 132 for alternately turning on and off the two switching elements 131, 132 by the high frequency output from the controller 15. Further, the choke coil 133 and the capacitor 134 resonate to keep the operation of the lamp during an operation of the lamp, While the choke coil 133 and the capacitor 135 resonate to start the lamp to operate. The capacitor 135 has a capacitance smaller than that of the capacitor 134.

The discharge lamp 14 is used as a load of the inverter 13 and wherein a discharge tube is folded in the U-shape to have a folded portion. Further, for the discharge lamp 14, the folded portion may be formed by communicating respective ends of two parallel discharge tubes with a communicating tube.

The controller 15 controls to turn on and off of switching elements 131, 132 in the inverter 13 and to dim the discharge lamp 14 by controlling the switching frequency of the switching elements 131, 132 based on a dimming control signal supplied to an input terminal 18 thereof from a control signal generator (not shown).

As the controller may control the dimming in more than two steps, when the light is heavily dimmed, non-uniform of brightness (non-uniform of luminance) between the electrodes and ends of a folded discharge lamp can be dissolved by the invention.

The auxiliary conductor 16 is prepared by a connector such as a metal foil or a metal plate. The auxiliary conductor 16 is then arranged to the folded portion of the discharge lamp 14.

For the auxiliary conductor, it is desirable to attach a copper strip foil, for example, with a width of ¼ of the tube diameter on the outer surface of the tube opposite to the light emitting surface of the tube. A copper, etc. are used for the metallic foil or the metal plate.

Then, the output end at the negative electrode side of the direct current power supply 12, that is, the stable potential terminal of the inverter 13 and the auxiliary conductor 16 are electrically connected using a lead wire 17.

In the discharge lamp driving apparatus that is constructed as described above, DC voltage obtained by the direct current power supply 12 is supplied to the inverter 13 and converted to an alternating current voltage, and high frequency voltage is supplied to the discharge lamp 14, that is a load, for the normal lighting. The inverter 13 is constructed using a modified half bridge circuit as described above. The operation when the inverter 13 is normally lighted will be described. DC voltage that is output from the direct current power supply 12 is supplied across the series circuit of the switching elements 131, 132 in the inverter 13.

The switching elements 131, 132 are turned on and off alternately according to a switching frequency, which is set by a dimming control signal supplied from the controller 15. When the switching element 131 is ON and the switching element 132 is OFF, current flows through a path including the positive (unstable) output terminal of the direct current power supply 12 → the switching element 131 → the choke coil 133 → the capacitor 134 → the electrode 141 of the discharge lamp 14 → the straight tube portion 143 of the discharge lamp 14 → the folded portion 145 → the straight tube portion 144 → the electrode 142 → the negative (stable) output terminal, when the switching element 131 is OFF and the switching element 132 is ON, a current based on the energy stored in the choke coil 133 flows through a path including the choke coil 133 → the capacitor 134 → the electrode 141 of the discharge 14 → the straight tube portion 143 → the folded portion 145 → the straight tube portion 144 → the electrode 142 of the discharge lamp 14 → the parasitic diode (not shown) of the switching element 132 → the choke coil 133.

After the current flowed, the capacitor 134 charges. Then based on the voltage charged in the capacitor 134, for the ON-period of the switching element 132, a current flows in the following order, i.e., the capacitor 134 → the choke coil 133 → the switching element 132 → the electrode 142 of the switching element 14 → the straight tube portion 144 → the folded portion 145 → the straight tube portion 143 → the electrode 141 of the discharge lamp 14 → the capacitor 134.

When the switching element 131 is turned ON and the switching element 132 is turned OFF, the current based on the energy stored in the choke coil 13 flows in the course of the negative (stable) output terminal of the direct current power supply 12 → the electrode 142 of the discharge lamp 14 → the straight tube portion 144 → the folded portion 145 → the straight tube portion 143 → the electrode 141 of the discharge lamp 14 → the capacitor 134 → the choke coil 138 > the parasitic diode (not shown) of the switching element 131 → the positive (unstable) output terminal of the direct current power supply 12. Then, the current flows again in the course of the positive output terminal of the direct current power supply 12 the switching element 131 > the choke coil 133 the capacitor 134 → the electrode 141 of the discharge lamp 14 → the straight tube portion 143 → the folded portion 145 → the straight tube portion 144 → the electrode 142 of the discharge lamp 14 → the negative (stable) output terminal of the direct current power supply 12.

Since theses currents flow repeatedly, high frequency current power is supplied to the discharge lamp 14. Therefore the discharge lamp 14 is lighting.

Further, in FIG. 1, as the auxiliary conductor 16 is arranged to the folded portion 145 of the folded discharge lamp and connected to the stable potential terminal of the inverter 13 (one electrode 142 side of the discharge lamp 14), the potential at the folded portion 145 of the discharge lamp 14 (i.e., at the middle of the full length of the folded discharge lamp) becomes a intermediate potential of the high frequency varying potential across the electrodes 141, 142 of the discharge lamp 14. When the electron emitting side electrode is assumed to be, for instance, the electrode 142, the electron energy emitted from the electrodes 141, 142 alternately is attracted toward the folded portion 145 arranged to at the middle position between the straight tube portions 144 and 143) that is at higher potential than the potential of the electrode 142 and flowing through the straight tube portions 144 and 143 toward another electrode (the electrode 141 at this time) at more higher potential than the folded portion 145 and enters into the electrode 141. Even if the polarity of high frequency potential had changed, the electrode 141 turns to the electron emitting electrode, and the electrode 142 turns to the electron receiving electrode and their operations remain unchanged. Accordingly, the whole of the leakage current (leakage electron energy) occurred near the electrodes 141, 142 becomes to flow within the discharge tube, and thus the problem of the non-uniform of brightness (non-uniform of luminance) along the straight tube sections between the electrodes 141, 142 and the folded portion 145 of the discharge lamp 14 is dissolved. Also a remarkable visual effect is achieved when the lamp voltage across the electrodes 141, 142 rises by a deep dimming (decreasing of brightness). And thus the problem of the non-uniform of brightness occurring at the deep dimming is also dissolved.

Furthermore, as the auxiliary conductor 16 is connected to the stable potential terminal of the inverter 13, there is an advantage of that it is hardly receive a detrimental effect (flickering, etc.) due to noises than the case that the auxiliary conductor 14 is connected to the unstable potential terminal of the inverter 13.

Figure 2:
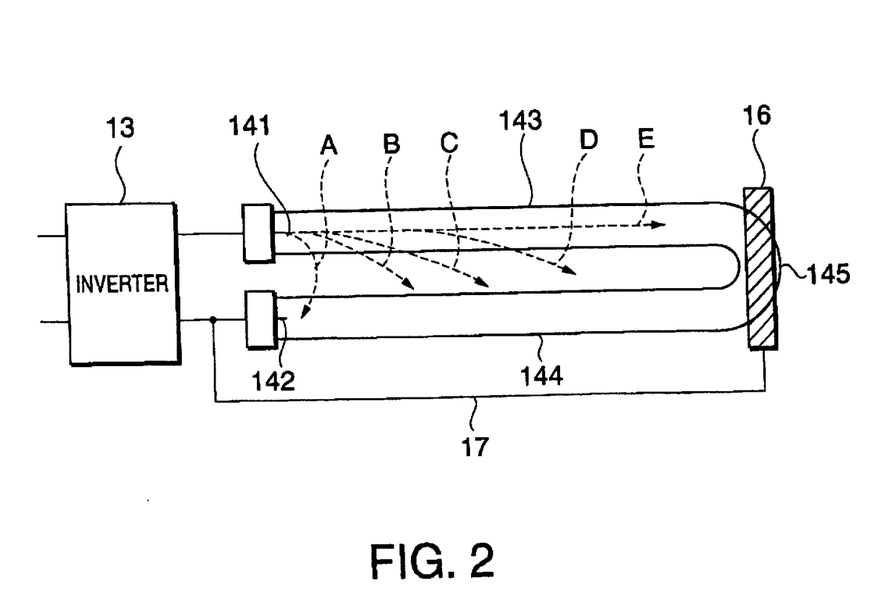
FIG. 2 is a top view of a discharge lamp for explaining a function of an auxiliary conductor.

Referring now to FIG. 2, an actual operation caused by connecting the auxiliary conductor 16 to the stable potential terminal of the inverter 13 through the lead wire 17 will be explained below.

In the state wherein the auxiliary conductor 16 arranged to the folded portion 145 of the discharge lamp 14 is connected to the unstable potential terminal of the inverter 18, a leakage current occurs near the electrodes 141, 142 of the discharge lamp 14, as shown by symbol A, at a dimming, etc. of the discharge lamp. On the other hand, when the auxiliary conductor 16 is connected to the stable potential terminal of the inverter 13, the passage of the electron energy corresponding to the leakage line A quickly moves in the order of leakage lines B → C → D→ . . . . That is, a phenomenon of electron energy flying far away, or a phenomenon of an arc extending longer, occurs in the discharge lamp. As a result, the entire electron energy becomes to move into the folded discharge straight tube portion 143. As a result, it becomes possible to pass the entire leakage energy within the straight tube portions 143, 144.

In the above explanation, the discharge lamp 14 has a configuration that the folded portion 145 is formed into the U-shape, and then the auxiliary conductor 16 is arranged to the surface of the U-shaped-folded portion. In practice, the auxiliary conductor 16 is arranged to the tube surface at the portion where the auxiliary conductor 16 does not obstruct a light irradiation.

Figure 3:
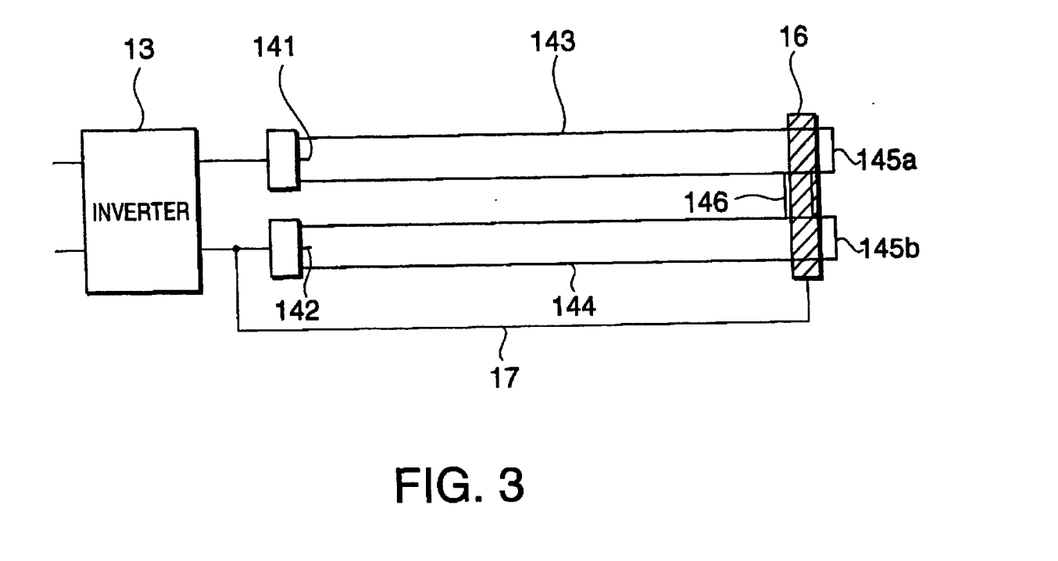
FIG. 3 is a top view of a discharge Lamp having an auxiliary conductor for a folded discharge lamp wherein a folded portion is configured by communicating respective far ends of two straight discharge tubes with a communicating tube.
Figure 4:
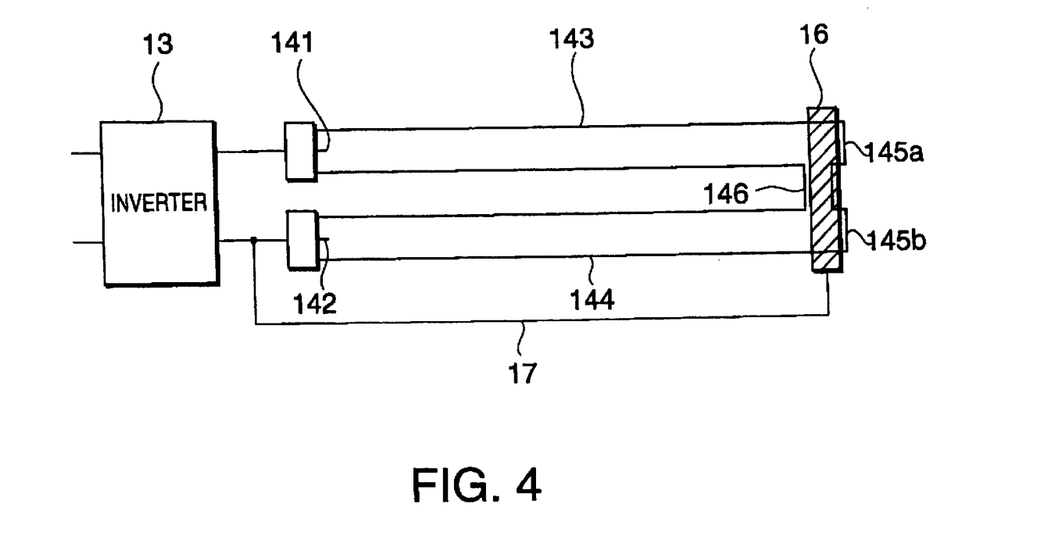
FIG. 4 is a diagram showing another location of the auxiliary conductor for a discharge lamp, wherein a folded portion is configured by communicating respective far ends of two straight discharge tubes with a communicating tube.

On the other hand, in the discharge lamp wherein the folded portion is formed by communicating respective ends of two parallel straight tubes with the communicating tube, as shown in FIGS. 3, and 4, the discharge lamp 14 comprises the electrodes 141, 142, the straight tubes 143, 144 and the communicating tube 146 that communicates the straight tubes 143, 144.

In case of such a communicating tube type, it is desirable to mount the auxiliary conductor 16 on the communicating tube 146, as shown in FIG. 3, or a position across the communicating tube 146 and the ends 145a, 145b of the straight tubes 143, 144, as shown in FIG. 4.

A high-frequency current flows efficiently in the straight tube portion between at least one electrode and the end of the folded discharge lamp, and non-uniform of luminance occurring along the folded discharge lamp along the straight tube portion can be dissolved effectually.

Figure 5:
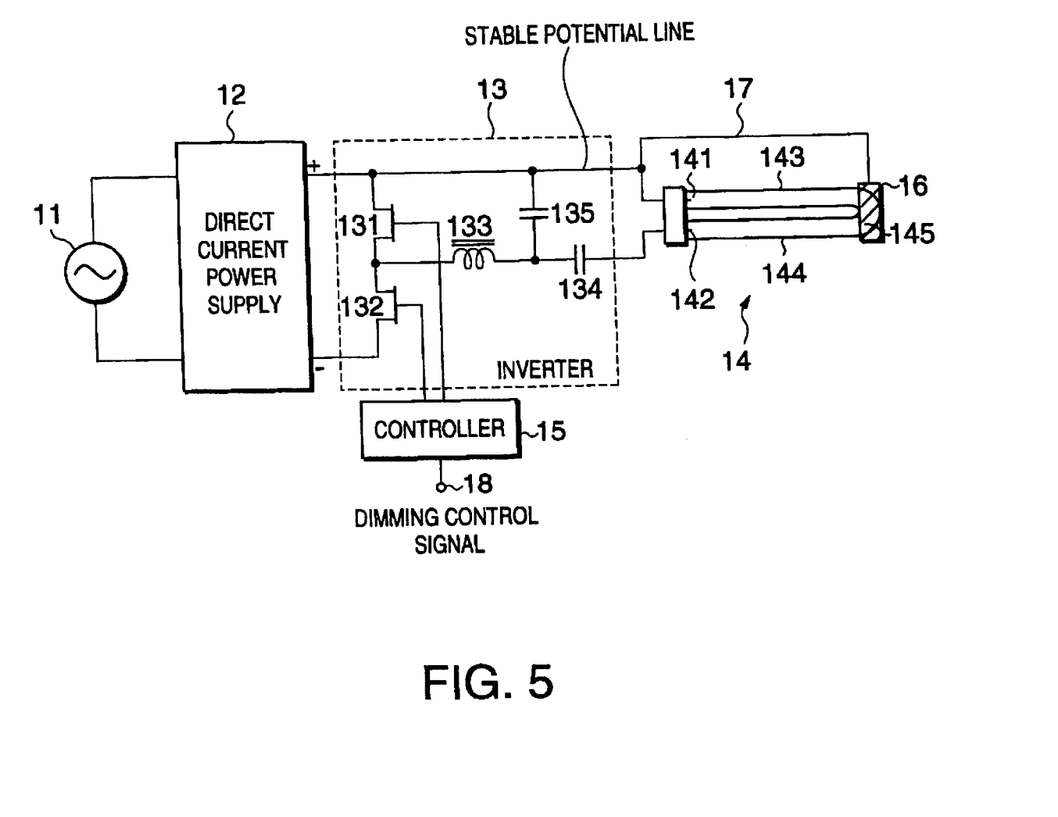
FIG. 5 is a block diagram showing a discharge lamp driving apparatus according to a second embodiment of the present invention.

FIG. 5 is a block diagram showing the discharge lamp driving apparatus according to a second embodiment of the present invention.

The discharge lamp driving apparatus shown in FIG. 5 is different from the discharge lamp driving apparatus shown in FIG. 1. An inverter 13 is so configured that a positive output terminal of a direct current power supply 12 acts as a stable potential terminal of the inverter 13, while the negative output terminal acts an unstable potential terminal of the inverter 13.

Even in such a configuration, as the auxiliary conductor 16 is connected to the stable potential terminal of the inverter 13 (i.e., the positive output terminal of the direct current power supply 12) with the lead wire 17, it becomes possible to achieve the same operation and effect as those in the first embodiment, as shown in FIG. 1.

Figure 6:
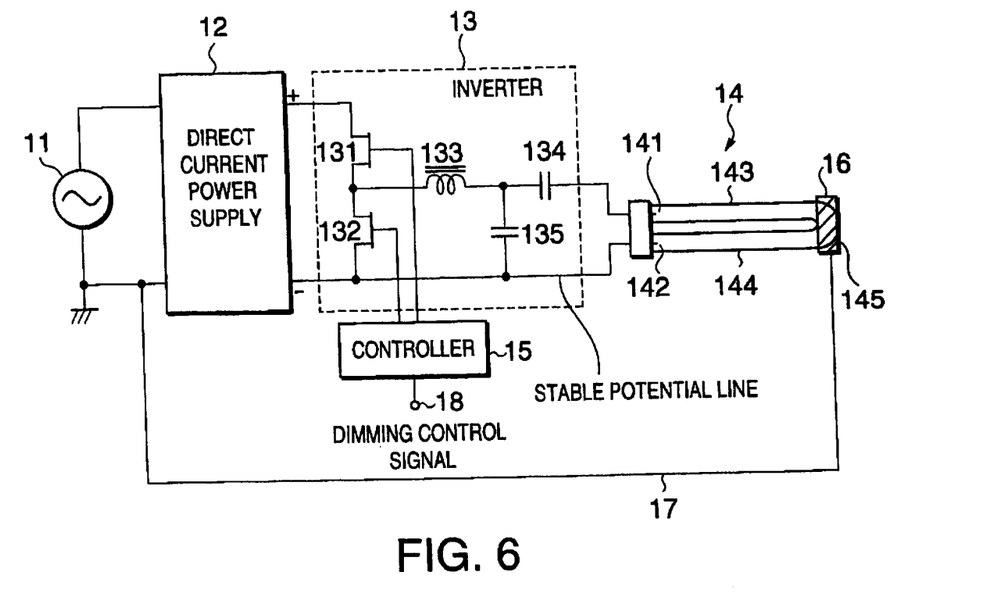
FIG. 6 is a block diagram showing a discharge lamp driving apparatus according to a third embodiment of the present invention.
Figure 7:
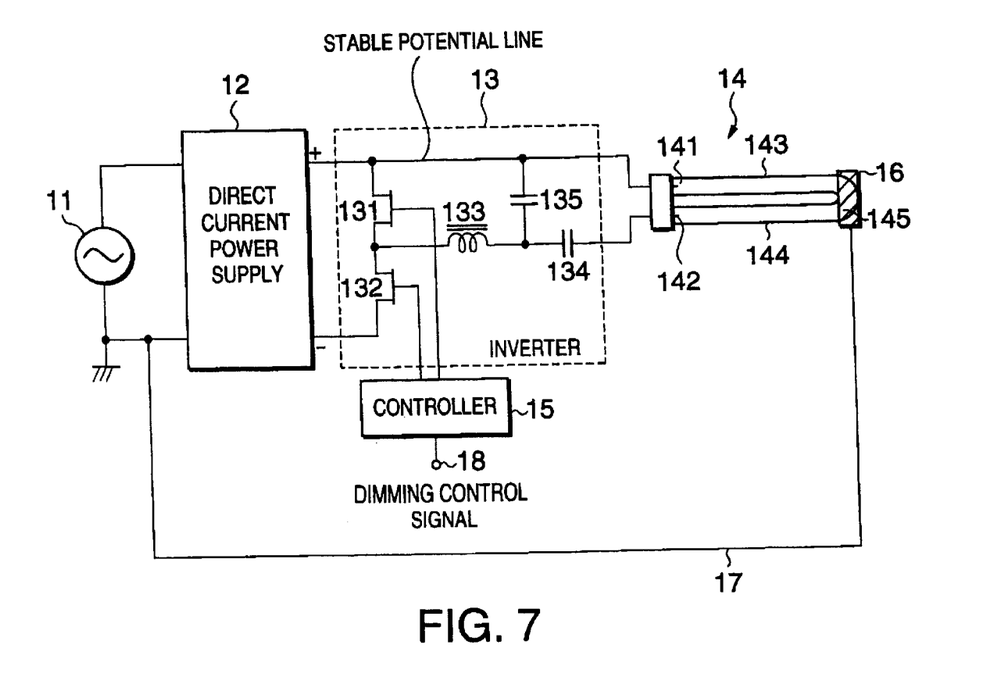
FIG. 7 is a block diagram showing a discharge lamp driving apparatus according to a fourth embodiment of the present invention.

FIGS. 6 and 7 are block diagrams showing each discharge lamp driving apparatus according to the third and fourth embodiments of the present invention.

The third embodiment, as shown in FIG. 6, is different from the first embodiment, as shown in FIG. 1, by that the auxiliary conductor 16 arranged to the folded portion of the discharge lamp 14 is connected to the ground potential circuit of the alternating current power source 11 through the lead wire 17. In this embodiment, a negative output terminal of the direct current power supply is stable. The rests of the configuration are the same as those of the first embodiment, as shown in FIG. 1.

The fourth embodiment, as shown in FIG. 7, is different from the second embodiment, as shown in FIG. 5, by that the auxiliary conductor 16 arranged to the folded portion of the discharge lamp 14 is connected to the ground potential circuit of the alternating current power source 11 through the lead wire 17. In this embodiment, a positive output terminal of the direct current power supply is stable. The rests of the configuration are the same as those of the third embodiment, as shown in FIG. 5.

In each embodiment of FIGS. 6 and 7, as the auxiliary conductor 16 arranged to the folded portion 145 of the discharge lamp 14 is connected to one output terminal (i.e., ground potential terminal) of the alternating current power source 11, the potential of the folded portion 145 (i.e., the middle of the entire length of the discharge tube) of the discharge lamp 14 becomes the zero potential of the high frequency varying potential across the electrodes 141, 142 of the folded discharged lamp 14. The energy of electrons, alternately emitted from the electrodes 141, 142, is then attracted toward the folded portion 145, which is located at respective one ends of the straight tube portions 144 and 143, with a potential (zero potential) higher than the negative potential of the electrode 142, when the electron emitting electrode is, e.g., the electrode 142, and runs toward the other electrode (electrode 141, in this case) through the straight tube portion 144, the folded portion 145 and the other straight tube portion 143 in the order. Even if the polarity of high frequency potential had changed, the electrode 141 turns to the electron emitting electrode, and the electrode 142 turns to the electron receiving electrode and their operations remain unchanged.

Accordingly, the energy of electrons does not leak outside the discharge lamp 14. Therefore, the problem of the non-uniform of brightness (non-uniform of luminance) along the straight tube sections between the electrodes 141, 142 and the folded portion 145 can be dissolved. The result of that the energy of electrons does not leak outside the discharge lamp 14 effectively improves visual effects when the lamp voltage across the electrodes 141, 142 rises according to a deep dimming. Therefore, the problem of the non-uniform of brightness occurring at the deep dimming is also dissolved.

Furthermore, as a result of that the auxiliary conductor 16 is connected to the ground potential terminal of the alternating current power source 11, there is an advantage of that the discharge lamp 14 hardly receives a detrimental effect (flickering, etc.) due to noises than the case that the auxiliary conductor 16 is connected to the non-ground potential terminal of the alternating current power source 11.

Further, there is such a merit that it becomes hardly subject to an adverse effect of noise (flickering, etc.) when compared with the connection of the auxiliary conductor to the unstable potential terminal of the inverter.

Figure 8:
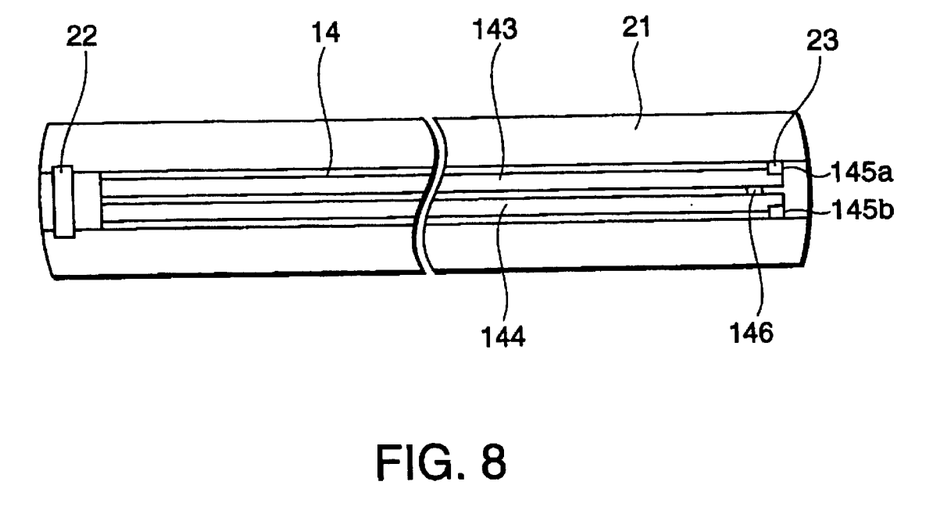
FIG. 8 is a plan view showing a lighting fixture according to one embodiment of the present invention.
Figure 9:
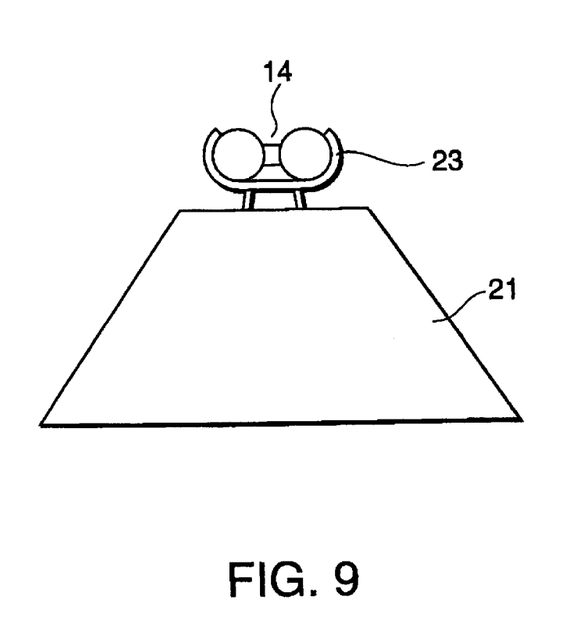
FIG. 9 is a side view of the lighting fixture shown in FIG. 8.

FIG. 8 shows one embodiment of a lighting fixture which comprises the discharge lamp driving apparatus shown in FIGS. 1, 5, 6 and 7 and a lighting fixture body. FIG. 9 is a side view of the lighting fixture shown in FIG. 8. Referring to FIGS. 8 and 9, the reference numeral 21 denotes the lighting fixture body. A lamp base of the discharge lamp 14 is arranged to a socket 22 arranged to the body 21. The folded portion of the discharge lamp 14 (preferably, the folded portion closes to the ends 145a, 145b) is held by a lamp holder 23 arranged to the body 21. The discharge lamp 14 having two parallel straight tube portions 143, 144 is arranged along the longitudinal direction of the body 21. According to this embodiment, the lamp holder 23 is made of connective material and also acts as an auxiliary conductor. The lamp holder 23 is connected to the stable potential terminal of the inverter shown in FIGS. 1 and 5, or a ground potential circuit of an alternating current power source shown in FIGS. 6 and 7.

When a folded discharge lamp is constructed in a configuration to hold the folded portion of the folded discharge lamp by the lamp holder, it is not required to provide an extra auxiliary conductor and it is rational and economical. A discharge lamp driving apparatus (not shown) is mounted in the body 21 of the lighting fixture. The discharge lamp driving apparatus may be provided outside the body 21 of the lighting fixture, in place of being provided inside the body 21. The lighting fixture embodied in accordance with the present invention may be utilized on a ceiling.

Further, when a discharge lamp is a fluorescent lamp having a tube diameter of about 17.5 mm and a tube length of about 1150 mm (the entire tube length of 2300 mm) has been used as a practical example of the discharge lamp 14, and for instance a 25% dimming (i.e., brightness in on-fourth of full (100%) lighting), the brightness around electrodes is clearly distinguished from the brightness around the folded portion with a visual check. However, when the auxiliary conductor has been arranged to the folded portion of the discharge lamp and the auxiliary conductor is connected to a stable potential terminal or the ground potential terminal of the driving apparatus, the non-uniformity of brightness (non-uniformity of luminance) between the portions around the electrodes and the folded portion of the discharge lamp had been eliminated. Such a deep dimming is particularly advantageous when the lighting fixture provided with the folded discharge lamp is used for a tunnel lighting. When a fluorescent lamp (a lamp tube diameter 17.5 mm and the lamp tube length 1150 mm) embodied according to the present invention is used for such tunnel lightings, a dimming around 25% to the full (100%) lighting operation may become necessary for lighting tunnels at midnight or the entrance/exit of the tunnel (or for lighting tunnels at a cloudy daylight. In practicing a 25% deep dimming for the tunnel lighting, the present invention is able to eliminate such a non uniform of luminance (non-uniform of brightness and non-uniform of lighting color) even in such a deep dimming.

On the other hand, when a small sized folded discharge lamp with a tube length shorter than the fluorescent lamp (the lamp tube diameter 17.5 mm, the lamp tube length 1150 mm) of the above example has been used, a conspicuous non-uniformity of brightness (non-uniformity of luminance) between the portions around the electrodes and the folded portion of the discharge lamp does not occur even in a 20% dimming. In other words, it has been confirmed that a conspicuous non-uniform of brightness (non-uniform of luminance) between the portions around the electrodes and the folded portion of the discharge lamp just comes to occur in a dimming (e.g., 10% or 5% dimming) much deeper than 20% dimming. On the contrary, when a large sized folded discharge lamp with a tube length longer than the fluorescent lamp (the lamp tube diameter 17.5 mm, the lamp tube length 1150 mm) of the above example has been used, a conspicuous non-uniform of brightness (non-uniform of luminance) occurs between the electrodes and the folded portion of the discharge lamp even when a dimming (for example, 30% dimming) slighter than 20% dimming.

As described above, the present invention can provide an extremely preferably discharge lamp driving apparatus and a lighting fixture that are which can dim stably without causing non-uniform of brightness along lamp tubes when lighting and dimming a folded discharge lamp.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A discharge lamp driving apparatus comprising:
   a direct current power supply having a rectifier;
   an inverter circuit, which has stable and unstable output terminals, converting a direct current power to an alternating current power with a predetermined high frequency and driving a discharge lamp having a folded portion;
   a controller for being able to dim the discharge lamp; and
   an auxiliary conductor, arranged to the folded portion of the discharge lamp, and electrically connected to the stable potential output terminal of the inverter.

2. A discharge lamp driving apparatus according to claim 1,
   wherein the discharge lamp comprises two straight tubes and a communicating tube, and the auxiliary conductor is located near the communicating tube or between the communicating tube and the ends of the straight tubes.

3. A discharge lamp driving apparatus according to claim 1,
   wherein the auxiliary conductor may hold the discharge lamp.

4. A discharge lamp driving apparatus according to claim 1,
   wherein the controller can dim the discharge lamp by way of at least two levels.

5. A discharge lamp driving apparatus according to claim 1,
   wherein the discharge lamp is a fluorescent lamp having an outer tube diameter of about 17.5 mm, a tube length of about 1150 mm and a rated lamp power of about 105 W, or more compact fluorescent lamp, and the controller can dim the discharge lamp by the ratio of 25% or less.

6. A discharge lamp driving apparatus comprising:
   an alternating current power source, which one end of output terminal is connected to a ground terminal;
   a direct current power supply having a rectifier;
   an inverter circuit, which has stable and unstable output terminals, converting a direct current power to an alternating current power with a predetermined high frequency, and driving a discharge lamp having a folded portion;
   a controller for being able to dim the discharge lamp; and
   an auxiliary conductor, arranged to the folded portion of the discharge lamp, and electrically connected to the ground potential terminal.

7. A lighting fixture comprising:
   a lighting fixture body; and
   a discharge lamp driving apparatus comprising a direct current power supply having a rectifier, an inverter circuit, which has stable and unstable output terminals, converting a direct current power to an alternating current power with a predetermined high frequency, and driving a discharge lamp having a folded portion, a controller for dimming the discharge lamp, an auxiliary conductor, located to the folded portion of the discharge lamp, and electrically connected to the stable potential output terminal of the inverter.

* * * * *